United States Patent [19]

Agarwal

[11] Patent Number: 4,857,604

[45] Date of Patent: Aug. 15, 1989

[54] BLENDS OF ELASTOMERIC POLYETHERESTER COPOLYMERS WITH THERMOPLASTIC POLYCARBONATES AND THERMOPLASTIC POLYALKYLENE TEREPHTHALATES

[75] Inventor: Surendra H. Agarwal, Bombay, India

[73] Assignee: General Electric Company, Pittsfield, Mass.

[21] Appl. No.: 889,584

[22] Filed: Jul. 22, 1986

Related U.S. Application Data

[63] Continuation of Ser. No. 567,986, Jan. 14, 1984, abandoned.

[51] Int. Cl.[4] .......................... C08K 5/13; C08L 69/00
[52] U.S. Cl. .................................... 525/439; 524/411; 524/412
[58] Field of Search ................ 523/435; 524/281, 412; 525/439

[56] References Cited

U.S. PATENT DOCUMENTS

| | | |
|---|---|---|
| 451,180 | 0/0000 | Fox et al. . |
| 3,218,372 | 11/1965 | Okamura et al. ................... 260/860 |
| 3,801,547 | 4/1974 | Hoeschele .............................. 260/75 |
| 3,907,926 | 9/1975 | Brown et al. ........................ 260/860 |
| 4,044,073 | 8/1977 | Baron et al. ......................... 260/860 |
| 4,203,887 | 5/1980 | Goedde et al. ........................ 260/40 |
| 4,337,192 | 6/1982 | Campbell .............................. 524/539 |
| 4,657,973 | 4/1987 | Endo et al. ........................... 525/439 |

FOREIGN PATENT DOCUMENTS

| | | |
|---|---|---|
| 53-97049 | 8/1978 | Japan . |
| 57-125248 | 8/1982 | Japan . |
| 1431916 | 4/1976 | United Kingdom . |
| 1569296 | 6/1980 | United Kingdom . |

*Primary Examiner*—Veronica P. Hoke

[57] ABSTRACT

Copolyetherester-containing blends having improved tensile strength together with high tear strength, tensile elongation and impact strength are prepared by creating an admixture of copolyetherester with a polycarbonate and, optionally, a polyester.

20 Claims, No Drawings

BLENDS OF ELASTOMERIC POLYETHERESTER COPOLYMERS WITH THERMOPLASTIC POLYCARBONATES AND THERMOPLASTIC POLYALKYLENE TEREPHTHALATES

This is a continuation of application Ser. No. 567,986, filed Jan. 4, 1984 now abandoned.

The present invention relates to low modulus elastomeric compositions having improved physical properties, particularly improved tensile strength and tensile elongation, with retained high impact strength. Specifically, low modulus copolyetherester compositions may be prepared having improved physical properties by blending therewith a polycarbonate and, optionally, a polyester, particularly poly(alkylene terephthalate) polyesters. Especially preferred polycarbonates are the aromatic polycarbonates.

BACKGROUND

Low modulus elastomeric copolyetherester compositions are widely known and have enjoyed significant commercial success due to their superior tear strength, flex life, and abrasion resistance. However, copolyetheresters suffer from limited processing capabilities in such procedures as profile extrusion, wire coating, blow molding, injection molding and so forth, as well as low tensile strength and flexural strength. Brown et al (U.S. Pat. No. 3,907,926) have prepared copolyetherester compositions having improved Young's modulus combined with good low temperature impact strength and flexability by creating a uniform blend of poly(butylene terephthalate) with a copolyetherester. In a similar patent, Perry et al (UK Patent No. 1,431,916) have improved the impact strength, stiffness, and processability of polyesters, particularly poly(alkylene terephthalates), by blending therewith a copolyetherester. It is an object of the present invention to prepare improved copolyetherester compositions having improved flexural strength, tensile strength and processability while retaining high impact strength and tensile elongation.

SUMMARY

According to the present invention, there is provided an improved copolyetherester-containing blend which has high flexural strength and tensile strength as well as being characterized as having good processability. Additionally, these compositions possess other desired qualities such as good abrasion resistance, tear strength, resistance to flex cut growth as well as high tensile elongation.

The improved copolyetherester containing blends of the present invention comprise an admixture of at least one copolyetherester with a polycarbonate, preferably an aromatic polycarbonate, and, optionally, a polyester, especially the poly(alkylene terephthalate) polyesters, most preferably poly(1,4 butylene terephthalate). The polycarbonate is present in an amount which will usually be between about 5 and 150 parts by weight polycarbonate per 100 parts by weight copolyetherester. The polyester, if present, will be present in an amount up to about 85% by weight based on the combined weight of polycarbonate and polyester. Optionally, these blend compositions may further comprise an effective amount, e.g., 0.05 to about 5.0 weight percent, based on the total composition of an antioxidant.

The copolyetherester polymer which is blended with the polycarbonate or polycarbonate-polyester blend consists essentially of a multiplicity of recurring intralinear long-chain and short-chain ester units connected head-to-tail through ester linkages, said long-chain ester units being represented by the following structure:

and said short-chain ester units being represented by the following structure:

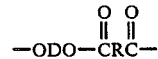

wherein G is a divalent radical remaining after removal of terminal hydroxyl groups from poly(alkylene oxide) glycols having a carbon-to-oxygen ratio of from 2.0–4.3 and a molecular weight between about 400 to 6000; R is a divalent radical remaining after removal of carboxyl groups from one or more dicarboxylic acids having a molecular weight less than about 300; and D is a divalent radical remaining after removal of hydroxyl groups from one or more saturated or unsaturated, low molecular weight diols having a molecular weight less than about 250, with the provisions that the short-chain ester units constitute about 15–95% by weight, preferably 25–90% by weight, of the copolyetherester and, ergo, the long-chain ester units constitute about 5–85% by weight, preferably 10–75% by weight of the copolyetherester.

DETAILED DESCRIPTION

The term "long-chain ester units" as applied to units in the copolyetherester polymer chain refers to the reaction product of long-chain glycol with dicarboxylic acids. Such "long-chain ester units", correspond to formula (a) above. The long-chain glycols are polymeric glycols having terminal (or as nearly terminal as possible) hydroxy groups and a molecular weight from about 400–6000. The long-chain glycols used to prepare the copolyetheresters of this invention are poly(alkylene oxide) glycols having a carbon-to-oxygen ration of about 2.0–4.3.

Representative long-chain glycols are poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen mole ratio in the glycol does not exceed about 4.3).

The term "short-chain ester units" as applied to units in the polymer chain refers to low molecular weight compounds or polymer chain units having molecular weights less than about 550. They are made by reacting one or more low molecular weight saturated or unsaturated diols (below about 250) with one or more dicarboxylic acids to form ester units represented by formula (b) above.

Included among the low molecular weight diols which react to form short-chain ester units are saturated and/or unsaturated aliphatic, cycloaliphatic, and aromatic dihydroxy compounds. Preferred are diols with 2-15 carbon atoms such as ethylene, propylene, tetramethylene, pentamethylene, 2,2-dimethyltrimethylene, hexamethylene and decamethylene glycols; dihydroxy cyclohexane; cyclohexane dimethanol; resorcinol; hydroquinone; 1,5-dihydroxy naphthalene, or mixtures of any one or more of these diols with unsaturated diols such as butene-diol, hexene-diol, etc. Especially preferred are saturated aliphatic diols, mixtures thereof or a mixture of a saturated diol(s) with an unsaturated diol(s), each diol containing 2–8 carbon atoms. Included among the bis-phenols which can be used are bis(p-hydroxy) diphenyl, bis(p-hydroxyphenyl)methane, and bis(p-hydroxyphenyl) propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol only and not to its derivatives.

Dicarboxylic acids which are reacted with the foregoing long-chain glycols and low molecular weight diols to produce the copolyesters of this invention are aliphatic, cycloaliphatic, or aromatic dicarboxylic acids of a low molecular weight, i.e., having a molecular weight of less than about 300. The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O—or —$SO_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, oxalic acid, azelaic acid, diethylmalonic acid, allylmalonic acid, 4-cyclohexene-1,2- dicarboxylic acid, 2-ethylsuberic acid, tetramethylsuccinic acid, cyclopentanedicarboxylic acid, decahydro-1,5-naphthalene dicarboxylic acid, 4,4- bicyclohexyl dicarboxylic acid, decahydro-2,6-naphthalene dicarboxylic acid, 4,4 methylenebis(cyclohexane carboxylic acid), 3,4-furan dicarboxylic acid, and 1,1-cyclobutane dicarboxylic acid. Preferred aliphatic acids are cyclohexanedicarboxylic acids and adipic acid.

Representative aromatic dicarboxylic acids which can be used include terephthalic, phthalic and isoptalic acids, bi-benzoic acid, substituted dicarboxy compounds with two benzene nuclei such as bis(p-carboxyphenyl) methane, oxybis(benzoic acid), ethylene-bis-(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4-sulfonyl dibenzoic acid, and $C_1$-$C_{12}$ alkyl and ring substitution derivatives thereof, such as halo, alkoxy, and aryl derivatives. Hydroxyl acids such as p(B-hydroxyethoxy) benzoic acid can also be used providing an aromatic dicarboxylic acid is also present.

Aromatic dicarboxylic acids are an especially preferred class for preparing the copolyetherester polymers of this invention. Among the aromatic acids, those with 8–16 carbon atoms are preferred, particularly the phenylene dicarboxylic acids, i.e., phthalic, terephthalic and isophthalic acids and their dimethyl derivatives.

It is preferred that at least about 30% of the short segments are identical and that the identical segments form a homopolymer in the fiber forming molecular weight range (molecular weight 5000) having a melting point of at least 150° C. and preferably greater than 200° C. Copolyetheresters meeting these requirements exhibit a useful level of properties such as tensile strength and tear strength. Polymer melting points are conveniently determined by a differential scanning calorimetry.

The short-chain ester units will constitute about 15–95 weight percent of the copolyetherester. The remainder of the copolyetherester will be the long segments, ergo the long segments will comprise about 5–85 weight percent of the copolyetherester. Copolyetheresters in which the short-chain units comprise 25–90 weight percent with 10–75 weight percent long-chain units are preferred.

Preferred copolyetheresters are those prepared from dimethyl terephthalate, 1,4 butanediol, and poly(tetramethylene oxide) glycol having a molecular weight of about 600 to about 2000 or poly(ethylene oxide) glycol having a molecular weight of about 600–1500. Optionally up to about 30 mole percent, preferably 5–20 mole percent of the dimethyl terephthalate in these polymers can be replaced by dimethylphthalate or dimethyl isophthalate. Other preferred copolyetheresters are those prepared from dimethyl terephthalate, poly(tetramethylene oxide) glycol having a molecular weight of about 600 to about 2000, and a mixture of 1,4 butanediol with up to about 50 mole percent, preferably from about 10 to about 40 mole percent of 1,6 hexane-diol or 1,4 butene-diol. The polymers based on poly(tetramethylene oxide) glycol are especially preferred because they are easily prepared, have overall superior physical properties, and are especially resistant to water.

Polycarbonates suitable for use in the present invention are any of those known in the art. Especially preferred polycarbonates are the aromotic polycarbonates. Aromatic polycarbonates useful herein are homopolymers, copolymers, and mixtures thereof, which have an intrinsic viscosity of from about 0.3 to about 1.0 dl/g as measured in methylene chloride at 25° C. These polycarbonates are derived from dihydric phenols such as, for example, 2,2-bis(4-hydroxyphenyl)-propane; bis(4-hydroxyphenyl) methane; 2,2-bis(4-hydroxy-3-methylphenyl) propane; 4,4-bis(4-hydroxy-phenyl) heptane; 2,2-(3,5, 3', 5'-tetracholoro-4,4'-dihydroxy phenyl) propane; 2,2-(3,4,3',5'-tetrabromo-4,4'-dihydroxydiphenyl) propane; and (3,3'-dichloro-4,4'-dihydroxyphenyl) methane. Other dihydric phenols which are also suitable for use in the preparation of the above polycarbonates are disclosed in U.S. Pat. Nos. 2,999,835; 3,028,365; 3,334,154 and 4,131,575.

These aromatic polycarbonates can be manufactured by known processes, such as, for example, by reacting a dihydric phenol with a carbonate precursor such as phosgene, a haloformate or a carbonate ester, in accordance with methods set forth in the above-cited literature and U.S. Pat. Nos. 4,018,750 and 4,123,436, or by transesterification processes such as disclosed in U.S. Pat. No. 3,153,008, as well as other processes known to those skilled in the art. All of the above-mentioned patents incorporated herein by reference.

The polycarbonates so produced are typified as processing recurring structural units of the formula

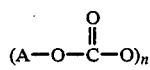

wherein A is a divalent aromatic radical remaining after removal of the hydroxyl groups from the dihydric phenol employed in the polymer producing reaction and n is greater than 1, preferably from about 10 to about 400. Preferred polycarbonate resins are of the formula:

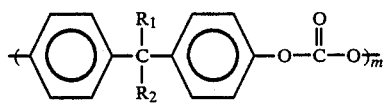

wherein $R_1$ and $R_2$ are independently hydrogen, (lower) alkyl or phenyl and m is at least 30 or preferably between 40 and 300. The term (lower) alkyl includes hydrocarbon groups of from 1 to 6 carbon atoms.

The aromatic polycarbonates utilized in the present invention also include the polymeric derivatives of a dihydric phenol, a dicarboxylic acid, and a carbonic acid such as disclosed in U.S. Pat. No. 3,169,121, incorporated herein by reference.

It is also possible to employ two or more different dihydric phenols or a copolymer of a dihydric phenol with a glycol or acid terminated polyester, or with a dibasic acid in the event a carbonate copolymer or interpolymer rather than a homopolymer is desired for use in the preparation of the aromatic polycarbonate utilized in the practice of this invention. Also employed in the practice of this invention can be blends of any of the above mentioned materials to provide the aromatic polycarbonate.

Branched polycarbonates, such as are described in U.S. Pat. No. 4,001,184, can be utilized in the practice of this invention, as can blends of linear polycarbonate and a branched polycarbonate.

As noted above, the aromatic polycarbonate can be added to the copolyetherester either alone or in combination with a polyester. Suitable polyesters are those derived from one or more aliphatic and/or cycloaliphatic glycols and one or more aromatic dicarboxylic acids. The glycol may be selected from the group consisting essentially of ethylene glycol; 2-methyl-1,3 propanediol; 1,4-butanediol; 1,5-pentane diol; 1,6-hexanediol and 1,4-cyclohexane dimethanol, and the like. Suitable dicarboxyclic acids include terephthalic acid, phthalic acid, isophthalic acid and naphthalene 2,6-dicarboxylic acid. The polyesters of the present invention may also contain minor amounts of other units such as aliphatic dicarboxylic acids and/or aliphatic polyols to form copolyesters. Generally, the polyesters of the present invention may be represented by the formula;

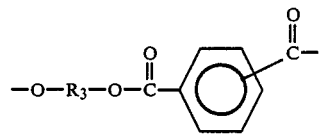

wherein $R_3$ represents the divalent radical remaining after removal of the hydroxyl groups from the glycol. Preferred polyesters include poly(ethylene terephthalate) and poly(butylene terephthalate).

The polyesters described herein are either commercially available or can be produced by methods well known in the art, such as those set forth in U.S. Pat. Nos. 2,465,319; 3,047,539 and 2,910,466, herein incorporated by reference. Further, the polyesters used herein have an intrinsic viscosity of from about 0.4 to about 2.0 dl/g as measured in 60:40 phenol/tetrachloro-ethane mixture or a similar solvent at 30°.

When the compositions of this invention contain both polycarbonate and polyester, the amount of polyester which may be present will be up to about 85 weight percent based on the combined weight of polycarbonate and polyester. It is preferred, however, that the polyester be present in an amount up to about 70 weight percent, most perferably up to about 50 weight percent, based on the combined weight of polycarbonate and polyester. In the preparation of the compositions of the present invention, the polyester and polycarbonate may be added to the copolyetherester individually, premixed or precompounded.

Generally, the compositions of the present invention will contain polycarbonate in an amount effective to improve the physical properties of the copolyetherester. This amount will usually be between about 5 and about 150 parts by weight based on 100 parts by weight of copolyetherester. Preferably, the polycarbonate will be present in an amount of from about 5 to about 100 parts by weight based on 100 parts by weight copolyetherester. As stated, above where polyester is also present, it will be present in an amount up to about 85%, preferably up to about 70% by weight based on the combined weight of polycarbonate and polyester. Although it is not essential, it is preferred that the total weight of polycarbonate and polyester not exceed about 150 parts by weight based on 100 parts by weight copolyetherester.

The compositions of the present invention may further contain stabilizers to protect the polymers from degradation due to heat or radiation by ultraviolet light. Satisfactory stabilizers comprise phenols and their derivatives, amines and their derivatives, compounds containing both hydroxyl and amine groups, hydroxyazines, oximes, polymericphenolic esters and salts of multivalent metals in which the metal is in its lower state.

Representative phenol derivatives useful as stabilizers include 3,5-di-tert-butyl-4-hydroxy hydrocinnamic triester with 1,3,5-tris-(2-hydroxyethyl-s-triazine-2,4,6-(1H,3H,5H)trione; 4,4'-bis(2,6-ditertiary-butylphenyl); 1,3,5-trimethyl-2,4,6-tris(3,5-ditertiary-butyl-4hydroxybenzyl)benzene and 4,4'-butylidene-bis (6-tertiarybutyl-m-cresol). Various inorganic metal salts or hydroxides can be used as well as organic complexes such as nickel dibutyl dithiocarbonate, manganous salicylate and copper 3-phenyl-salicylate. Typical amine stabilizers include N,N'-bis(beta-naphthyl)-p-phenylene diamine; N,N'-bis(1-methylheptyl)-p-phenylene diamine and either phenyl-beta-naphthyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones and/or benzotriazoles.

The copolyetherester blend compositions of the present invention may also be rendered flame retardant by use of suitable flame retardant agents. Suitable flame retardant agents are as disclosed in U.S. Pat. Nos. 3,751,400; 3,855,277 and 3,975,905. Especially preferred are the polymeric and oligomeric flame retardant agents comprising tetrabromobisphenol-A carbonate units, see for example U.S. Pat. No. 3,833,685. All of the aforementioned patents are incorporated herein by reference. Other preferred flame retardant agents are known in the art and include, for example, brominated epoxy compounds. It is also contemplated that the foregoing flame retardants may be used in combination with synergists including for example antimony compounds.

Further, the properties of these polyesters can be modified by incorporation of various conventional inorganic fillers such as carbon black, silica gel, alumina, clays and chopped fiberglass. These may be incorporated in amounts up to 50% by weight, preferably up to about 30% by weight. In general, these additives have the effect of increasing the modulus of the material at various elongations.

DETAILED DESCRIPTION OF THE PREFERRED EMBODIMENTS

The following examples are presented as illustrative of the present invention and are not to be construed as limiting thereof. Unless otherwise stated, all compounds were prepared by preblending the ingredients followed by extrusion through a single screw extruder at 460° F. (600° F. for polycarbonate-sulfone).

EXAMPLES E1–E3, COMPARATIVE EXAMPLES CE1–CE2

Compounds were prepared to demonstrate the compatability of compositions prepared from polycarbonates and copolyetheresters and, more importantly, the improved physical properties, especially tensile strength, realized in such blends. For comparative purposes, unblended copolyetherester and a copolyetherester-polyester blend are also presented. The specific formulations and physical properties of the resulting composition are shown in Table 1.

TABLE 1

|  | CE1 | CE2 | E1 | E2 | E3 |
|---|---|---|---|---|---|
| GAFLEX[a] 555 | 100 | 54 | 54 | 54 | 59.6 |
| LEXAN[b] 131 resin | — | — | 35 | 17.5 | 18 |
| Polybutylene terephthalate | — | 35 | — | — | — |
| Polyethylene terephthalate | — | — | — | 17.5 | — |
| Fire Retardant[c] | — | — | — | — | 21 |
| Stabilizer | — | 1 | 1 | 1 | 1.4 |
| Physical Properties |  |  |  |  |  |
| Flexural Modulus psi | 24,500 | 95,500 | 95,500 | 77,000 | 76,000 |

TABLE 1-continued

|  | CE1 | CE2 | E1 | E2 | E3 |
|---|---|---|---|---|---|
| Flexural Strength psi | 1,500 | 4,500 | 4,500 | 3,800 | 3,500 |
| Tensile Strength psi | 1,900 | 3,900 | 4,800 | 3,800 | 4,500 |
| Tensile Elongation % | 300 | 261 | 185 | 162 | 223 |
| Notched Izod Impact Strength ft. lb./in. | NB | NB | 17.5 | 15.5 | NB |

[a]Copolyetherester derived from 1,4 butanediol, 1,4 butenediol, dimethyl terephthalate and poly(tetramethylene oxide) glycol from GAF.
[b]Polycarbonate resin from General Electric Company.
[c]Halogenated bisphenol flame retardant with synergist.

A comparison of comparative examples CE1 with comparative examples CE2 and examples E1 through E3 demonstrates the improved properties realized by incorporating in a copolyetherester a high molecular weight thermoplastic. Further, comparison of comparative examples CE2 with example E1 demonstrates clearly the improved tensile strength realized by incorporating polycarbonate into the copolyetherester as opposed to a polyester, as taught by the prior art. Furthermore, these compositions retain high impact strength as well as their good flexural modulus and flexural strength. Example E2 demonstrates the effectiveness of a polycarbonate/polyester blend as modifier for the copolyetherester. Specifically, example E2 demonstrates that the improvement in physical properties attained by incorporating an additional thermoplastic polymer, e.g. either polycarbonate or polyester, in the copolyetherester is, for the most part, retained in copolyetherester compositions modified with two or more thermoplastic polymers, particularly polycarbonate and polyester, and such compositions have much lower flexural modulus. Thus, lower modulus compositions may be prepared having high strength. Example E3 demonstrates flame retardant copolyetherester/polycarbonate blend compositions which achieve a V-0 rating wherein the flame retardant composition is comprised primarily of a brominated bisphenol carbonate oligomer.

EXAMPLES E4 THROUGH E6

Examples E4 through E6 were prepared in order to demonstrate the various levels by which polycarbonate may be incorporated into the copolyetherester. The specific formulations and physical properties of these resulting polymers are set forth in Table 2.

TABLE 2

|  | E4 | E5 | E6 |
|---|---|---|---|
| Gaflex 555[a] | 84.8 | 69.8 | 49.8 |
| Lexan 131[b] resin | 15.0 | 30.0 | 50.0 |
| Stabilizer | 0.2 | 0.2 | 0.2 |
| Notched Izod, ft. lbs./in. | NB | 13.8 | 17.0 |
| Double-Gated Unnotched Izod, ft. lbs./in. | NB | NB | 21.5 |

[a]Copolyetherester derived from 1,4 butanediol, 1,4 butenediol, dimethyl terephthalate and poly(tetramethylene oxide) glycol from GAF.
[b]Polycarbonate resin from General Electric Company.

EXAMPLES E7–E8, COMPARATIVE EXAMPLES CE3–CE4

Another series of examples was prepared to demonstrate the effectiveness of the compositions of the present invention as opposed to the prior art compositions wherein polycarbonate-sulfones are modified with copolyetheresters. The specific formulations and physical properties of these examples are set forth in Table 3.

TABLE 3

|  | E7 | CE3 | E8 | CE4 |
| --- | --- | --- | --- | --- |
| Polycarbonate-sulfone[a] | — | 30 | — | 50 |
| Lexan[b] 131 resin | 30 | — | 50 | — |
| Stabilizer | 1 | 1 | 1 | 1 |
| GAFLEX[c] 555 | 69 | 69 | 49 | 49 |
| Notched Izod ft. lb./in. | NB(15.4) | 11.4(PB)[d] | 17.1(PB)[d] | 8.5(HB)[e] |
| Flexural Strength psi | 4360 | 4360 | 3570 | 4360 |
| Flexural Modulus psi | 94,400 | 104,800 | 86,800 | 106,000 |
| Tensile Strength psi | 2560 | 2300 | 4740 | 4160 |
| Tensile Elongation % | 257% | 128% | 196% | 38% |

[a] Polycarbonate-sulfone from General Electric Company.
[b] Polycarbonate resin from General Electric Company.
[c] Copolyetherester derived from 1,4 butane diol, 1,4 butene-diol, dimethyl terephthalate and poly(tetramethylene) glycol from GAF Corporation.
[d] Partial break
[e] Hinged break A review of the results shown in Table 3 clearly demonstrates the superiority shown by aromatic polycarbonates when mixed with copolyetherester as opposed to aromatic polycarbonate-sulfones as taught by the prior art. Specifically, the aromatic polycarbonates show superior tensile strength and greatly superior tensile elongation as well as improved Notched Izod impact strength. Most importantly, these improved physical properties are achieved at much lower flexural modulus. Thus, the use of polycarbonate versus polycarbonate-sulfones allows the production of a much stronger and more flexible material.

Examples E9–E12, Comparative Example CE5

Finally, a series of compositions was prepared to further demonstrate the utility and breadth of embodiments of the present invention wherein both polycarbonate and polyester are admixed with copolyetherester. Specifically, these compositions comprise aromatic BPA polycarbonate, poly(1,4 butylene terephthalate) and copolyetherester. The formulations and physical properties of each are as set forth in Table 4.

TABLE 4

|  | E9 | E10 | E11 | E12 | CE5 |
| --- | --- | --- | --- | --- | --- |
| GAFLEX 555[a] | 69 | 69 | 69 | 64 | 66 |
| LEXAN 101[b] resin | 15 | 10 | 5 | 15 | — |
| VALOX 295[c] resin | 15 | 20 | 25 | 20 | 33 |
| Stabilizer | 1.0 | 1.0 | 1.0 | 1.0 | 1.0 |
| Flexural Modulus, psi | 72500 | 74700 | 75700 | 87200 | 87200 |
| Tensile Strength, psi | 4100 | 4250 | 3780 | 4740 | 3200 |
| Flexural Strength, psi | 3440 | 3450 | 3490 | 3860 | 3990 |
| Double Gate Tensile Elongation, % | 67.5 | 47.5 | 26.7 | 35.8 | 17.5 |

[a] and [b] see Table 1
[c] Poly(1,4 butylene terephthalate) from General Electric Company.

A comparison of comparative example CE5 with examples E9–E12 further demonstrates the superiority of the compositions of the present invention over those of the prior art. Specifically, the compositions of the present invention have, generally, lower flexural modulus than the prior art compositions while retaining good flexural strength and more importantly providing much improved tensile strength. Further, the compatability of the compositions of the present invention is much greater as demonstrated by their high values for double gate tensile elongation. Additionally, due to the good solvent resistance of polyesters, particularly poly(1,4 butylene terephthalate), these compositions may show somewhat better chemical or solvent resistance than those without polyesters.

Furthermore, in the preparation of all of the above examples, it was noted that processability of the copolyetherester was improved by the addition of the polycarbonate resin.

Obviously, other modifications and variations of the present invention are possible in light of the above teachings. It is, therefore, to be understood that changes may be made in the particular embodiments of the invention described which are within the full intended scope of the invention as defined by the appended claims.

I claim:

1. A copolyetherester-containing blend consisting essentially of a copolyetherester resin, a polycarbonate resin and a poly(alkylene terephthalate) resin wherein the polycarbonate is present in an amount of from about 5 to about 150 parts by weight per 100 parts copolyetherester, and the poly(alkylene terephthalate) is present in an amount up to about 70% by weight based on the combined weight of copolyetherester and polycarbonate.

2. The composition of claim 1 wherein the polycarbonate is present in an amount of from about 5 to about 100 parts by weight per 100 parts copolyetherester, and the poly(alkylene terephthalate) is present in an amount up to about 50% by weight based on the combined weight of copolyetherester and polycarbonate.

3. The composition of claim 1 wherein the polycarbonate is present in an amount of from about 5 to about 27 parts by weight per 100 parts copolyetherester, and the poly(alkylene terephthalate) is present in an amount of from 17 to 34% by weight based on the combined weight of copolyetherester and polycarbonate.

4. The composition of claim 1 wherein the copolyetherester consists essentially of a multiplicity of recurring intralinear long-chain and short-chain ester units connected head-to tail through ester linkages, said long-chain ester units being represented by the following structure:

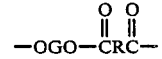

and said short ester units being represented by the following structure

wherein G is a divalent radical remaining after removal of terminal hydroxy groups from poly(alkylene oxide) glycols having a carbon-to-oxygen ratio of about 2.0–4.3 and a molecular weight between about 400–6000; R is a divalent radical remaining after removal of carboxyl groups from one or more dicarboxylic acids having a molecular weight less than about 300; and D is a divalent radical remaining after removal of hydroxyl groups from one or more saturated or unsaturated, low molecular weight diols having a molecular weight less than about 250; with the provision that the short-chain ester units consitute about 15–95% by weight of the copolyetherester.

5. The composition of claim 4 wherein the copolyetherester is derived from:

(a) An aromatic dicarboxylic acid or acid combination consisting of:
   (i) 70 to 100 mole % dimethyl terephthalate, and;
   (ii) 0 to 30 mole % of dimethyl isophthalate or dimethylphthalate;
(b) A diol or diol combination consisting of:
   (i) 50 to 100 mole % butanediol, and;
   (ii) 0 to 50 mole % of a $C_2$ to $C_8$ diol, and
(c) Poly(tetramethylene oxide) glycol.

6. The composition of claim 4 wherein the copolyetherester is derived from:
(a) Dimethyl terephthalate
(b) A diol or diol combination consisting of:
   (i) 50 to 100 mole % butanediol, and;
   (ii) 0to 50 mole % hexanediol or butenediol, and;
(c) Poly(tetramethylene oxide) glycol.

7. The composition of claim 6 wherein the copolyetherester is derived from butane diol, poly(tetramethylene oxide) glycol and dimethylterephthalate.

8. The composition of claim 6 wherein the copolyetherester is derived from butane diol, hexane diol, poly(tetramethylene oxide) glycol and dimethylterephthalate.

9. The composition of claim 6 wherein the copolyetherester is derived from butane diol, butenediol, poly(tetramethylene oxide) glycol and dimethylterephthalate.

10. The composition of claim 1 wherein the polycarbonate is derived from a dihydric phenol and a carbonate precursor.

11. The composition of claim 10 wherein the dihydric phenol is 2,2-bis(4-hydroxy phenyl)propane and the carbonate precursor is selected from the group consisting of phosgene, haloformates, and carbonate esters.

12. The composition of claim 10 wherein the dihydric phenol is 2,2-bis(4-hydroxy phenyl) propane and the carbonate precursor is phosgene.

13. The composition of claim 1 wherein the polycarbonate contains repeating structural units of the formula:

wherein A is the divalent aromatic radical remaining after removal of the hydrozy groups of the dihydric phenol employed in preparing the polymer.

14. The composition of claim 1 wherein the polycarbonate is derived from a dihydric phenol, a dicarboxylic acid, and a carbonate precursor.

15. The composition of claim 1 wherein the poly(alkylene terphthalte) contains repeating structural units of the formula:

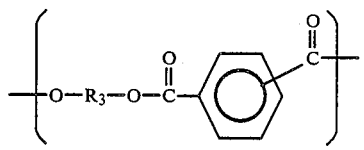

wherein $R_3$ represents the divalent radical remaining after removal of the hydroxy groups of the glycol employed in the preparation of the polyester.

16. The composition of claim 1 wherein the poly(alkylene terephthalate) is derived from one or more glycols selected from the group consisting of ethylene glycol, 1,4-butanediol, 2-methyl-1,3-propanediol, 1,6-hexanediol, and 1,4-cyclohexanedimethanol and dimethylterephthalate or terephthalic acid.

17. The composition of claim 1 wherein the poly(alkylene terephthalate) is selected from the group consisting of poly(ethylene terephthalate) and poly(butylene terephthalate).

18. The composition of claim 1 wherein the poly(alkylene terephthalate) is poly(butylene terephthalate).

19. The composition of claim 1 which further consists of up to 60% by weight of an inorganic filler or reinforcing agent selected from the group consisting essentially of carbon powder, clay, mica, and chopped fiberglass.

20. The composition of claim 1 which further consists of an effective flame retarding amount of a bromine-containing flame retardant alone or in combination with a flame retardant synergist.

* * * * *